(12) United States Patent
Ogbolu et al.

(10) Patent No.: US 12,454,462 B1
(45) Date of Patent: *Oct. 28, 2025

(54) HIGH-PERFORMANCE SODIUM ION ELECTROLYTES AND EFFICIENT METHODS FOR MAKING THE SAME

(71) Applicant: Florida State University Research Foundation, Inc., Tallahassee, FL (US)

(72) Inventors: Bright Ogbolu, Tallahassee, FL (US); Yan-Yan Hu, Tallahassee, FL (US); Thilina Nadeemali Dik Dikella Gamaralalage, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/263,707

(22) Filed: Jul. 9, 2025

Related U.S. Application Data

(62) Division of application No. 19/176,246, filed on Apr. 11, 2025, now Pat. No. 12,391,563, which is a division of application No. 18/894,204, filed on Sep. 24, 2024, now Pat. No. 12,304,827.

(60) Provisional application No. 63/584,936, filed on Sep. 25, 2023.

(51) Int. Cl.
 C01D 3/04 (2006.01)
(52) U.S. Cl.
 CPC ............ C01D 3/04 (2013.01); *C01P 2002/74* (2013.01); *C01P 2002/86* (2013.01); *C01P 2006/40* (2013.01)

(58) Field of Classification Search
 CPC ...................................................... C01D 3/04
 See application file for complete search history.

(56) References Cited

U.S. PATENT DOCUMENTS

2023/0411616 A1   12/2023   Jung et al.

FOREIGN PATENT DOCUMENTS

CN            115911531 A      4/2023

OTHER PUBLICATIONS

Gao, Y.; Nolan, A M.; Du, P.; Wu, Y.; Yang, C.; Chen, Q.; Mo, Y.; Bo, S. H. Classical and Emerging Characterization Techniques for Investigation of Ion Transport Mechanisms in Crystalline Fast Ionic Conductors. Chemical Reviews. American Chemical Society Jul. 8, 2020, pp. 5954-6008. https://doi.org/10.1021/acs.chemrev.9b00747.

(Continued)

*Primary Examiner* — James A Fiorito
(74) *Attorney, Agent, or Firm* — Thomas | Horstemeyer, LLP

(57) ABSTRACT

In accordance with the purpose(s) of the present disclosure, as embodied and broadly described herein, the disclosure, in one aspect, relates to the efficient and rapid synthesis of high-performance sodium ion electrolytes. The electrolytes have the general formula $Na_{u+v}N_{w-y}M_yLa_zCl_{3-v}X_v$. The electrolytes possess superionic conductivity and display a low electronic conductivity, which ensures negligible electron transport contribution to the measured total conductivity and thereby enhancing safety when applied in energy storage devices. The synthesis of the electrolytes is significantly faster when compared to the synthesis of lithium electrolytes and the process can be scalable to produce large amounts of electrolytes.

20 Claims, 12 Drawing Sheets

A

B

C

(56) References Cited

OTHER PUBLICATIONS

Helm, B.; Minatra, N.; Wankmiller, B.; Agne, M. T.; Li, C.; Senyshyn, A; Hansen, M. R.; Zeier, W. G. Correlating Structural Disorder to Li+Ion Transport in Li4-XGe1-XSbxS4(0:.,; x:.,; 0.2). Chemistry of Materials 2022, 34 (12), 5558-5570. https://doi.org/10.1021/acs.chemmater.2c00608.

Chen, H.; Adams, S. Bond Softness Sensitive Bond-Valence Parameters for Crystal Structure Plausibility Tests. IUCrJ 2017, 4, 614-625. https://doi.org/10.1107/S2052252517010211.

Bloembergen, N.; Purcell, E. M.; Pound, R. V. Relaxation Effects in Nuclear Magnetic Resonance Absorption. 1948, 73 (7), 679-712. https://doi.org/10.1103/physrev.73.679.

Pecher, O.; Carretero-Gonzalez, J.; Griffith, K. J.; Grey, C. P. Materials' Methods: NMR in Battery Research. Chemistry of Materials. American Chemical Society Jan. 10, 2017, pp. 213-242. https://doi.org/10.1021/acs.chemmater.6b03183.

Heitjans, P.; Indris, S.; Wilkening, M. Solid-State Diffusion and NMR; 2005.

Reif, B.; Ashbrook, S. E.; Emsley, L.; Hong, M. Solid-State NMR Spectroscopy. Nature Reviews Methods Primers. Springer Nature Dec. 1, 2021. https://doi.org/10.1038/s43586-020-00002-1.

Uitz, M.; Epp, V.; Bottke, P.; Wilkening, M. Ion Dynamics in Solid Electrolytes for Lithium Batteries: Probing Jump Rates and Activation Energies through Time-Domain Li NMR. J Electroceram 2017, 38 (2-4), 142-156. https://doi.org/10.1007/s10832-017-0071-4.

Stoffler, H.; Zinkevich, T.; Yavuz, M.; Senyshyn, A; Kulisch, J.; Hartmann, P.; Adermann, T.; Randau, S.; Richter, F. H.; Janek, J.; Indris, S.; Ehrenberg, H. Li+-Ion Dynamics in δ€€¥-Li3PS4 Observed by NMR: Local Hopping and Long-Range Transport. Journal of Physical Chemistry C 2018, 122 (28), 15954-15965. https://doi.org/10.1021/acs.jpcc.8b05431.

Duff, B. B.; Elliott, S. J.; Gamon, J.; Daniels, L. M.; Rosseinsky, M. J.; Blanc, F. Toward Understanding of the Li-Ion Migration Pathways in the Lithium Aluminum Sulfides Li3AlS3 and Li4.3AlS3.3Cl0.7 via 6,7Li Solid-State Nuclear Magnetic Resonance Spectroscopy. Chemistry of Materials 2023, 35 (1), 27-40.

Famprikis, T.; Kudu, 0. U.; Dawson, J. A; Canepa, P.; Fauth, F.; Suard, E.; Zbiri, M.; Dambournet, D.; Borkiewicz, 0. J.; Bouyanfif, H.; Emge, S. P.; Cretu, S.; Chotard, J. N.; Grey, C. P.; Zeier, W. G.; Islam, M. S.; Masquelier, C. Under Pressure: Mechanochemical Effects on Structure and Ion Conduction in the Sodium-Ion Solid Electrolyte Na3PS4. J Am Chem Soc 2020, 142 (43), 18422-18436. https://doi.org/10.1021/jacs.0c06668.

Schlem, R.; Burmeister, C. F.; Michalowski, P.; Ohno, S.; Dewald, G. F.; Kwade, A; Zeier, W. G. Energy Storage Materials for Solid-State Batteries: Design by Mechanochemistry. Advanced Energy Materials. John Wiley and Sons Inc Aug. 1, 2021. https://doi.org/10.1002/aenm.202101022.

Adams, S. From Bond Valence Maps to Energy Landscapes for Mobile Ions in Ion-Conducting Solids. Solid State Ion 2006, 177 (19-25 Spec. Iss.), 1625-1630. https://doi.org/10.1016/j.ssi.2006.03.054.

Wong, L. L.; Phuah, K. C.; Dai, R.; Chen, H.; Chew, W. S.; Adams, S. Bond Valence Pathway Analyzer—An Automatic Rapid Screening Tool for Fast Ion Conductors within SoftBV. Chemistry of Materials 2021, 33 (2), 625-641. https://doi.org/10.1021/acs.chemmater.0c03893.

Wu, E. A; Banerjee, S.; Tang, H.; Richardson, P. M.; Doux, J.M.; Qi, J.; Zhu, Z.; Grenier, A; Li, Y.; Zhao, E.; Deysher, G.; Sebti, E.; Nguyen, H.; Stephens, R.; Verbist, G.; Chapman, K. W.; Clement, R. J.; Banerjee, A; Meng, Y. S.; Ong, S. P. A Stable Cathode-Solid Electrolyte Composite for High-Voltage, Long-Cycle-Life Solid-State Sodium-Ion Batteries. Nat Commun 2021, 12 (1). https://doi.org/10.1038/s41467-021-21488-7.

Yin, Y. C.; Yang, J. T.; Luo, J. Da; Lu, G. X.; Huang, Z.; Wang, J. P.; Li, P.; Li, F.; Wu, Y. C.; Tian, T.; Meng, Y. F.; Mo, H. S.; Song, Y. H.; Yang, J. N.; Feng, L. Z.; Ma, T.; Wen, W.; Gong, K.; Wang, L. J.; Ju, H. X.; Xiao, Y.; Li, Z.; Tao, X.; Yao, H. Bin. A LaCl3-Based Lithium Superionic Conductor Compatible with Lithium Metal. Nature 2023, 616 (7955), 77-83. https://doi.org/10.1038/s41586-023-05899-8.

Ohno, S.; Zeier, W. G. Sodium Is the New Lithium. Nature Energy. Nature Research Aug. 1, 2022, pp. 686-687. https://doi.org/10.1038/s41560-022-01084-9.

Chi, X.; Zhang, Y.; Hao, F.; Kmiec, S.; Dong, H.; Xu, R.; Zhao, K.; Ai, Q.; Terlier, T.; Wang, L.; Zhao, L.; Guo, L.; Lou, J.; Xin, H. L.; Martin, S. W.; Yao, Y. An Electrochemically Stable Homogeneous Glassy Electrolyte Formed at Room Temperature for All-Solid-State Sodium Batteries. Nat Commun 2022, 13 (1 ). https://doi.org/10.1038/s41467-022-30517-y.

Janek, J.; Zeier, W. G. A Solid Future for Battery Development. Nature Energy. Nature Publishing Group Sep. 8, 2016. https://doi.org/10.1038/nenergy.2016.141.

Janek, J.; Zeier, W. G. Challenges in Speeding up Solid-State Battery Development. Nature Energy. Nature Research 2023. https://doi.org/10.1038/s41560-023-01208-9.

HIGH-PERFORMANCE SODIUM ION ELECTROLYTES AND EFFICIENT METHODS FOR MAKING THE SAME

CROSS-REFERENCE TO RELATED APPLICATIONS

This application is a divisional application of U.S. Nonprovisional application Ser. No. 19/176,246 filed on Apr. 11, 2025, which is a divisional application of U.S. Nonprovisional application Ser. No. 18/894,204 filed on Sep. 24, 2024, which claims the benefit of and priority to co-pending U.S. Provisional Patent Application No. 63/584,936, filed on Sep. 25, 2023, the contents of which are incorporated by reference herein in their entireties.

BACKGROUND

The pressing need for high-performance energy storage solutions has fueled intense research efforts to develop advanced solid-state electrolytes capable of overcoming the limitations of conventional liquid electrolytes. Solid-state batteries, with their potential for enhanced safety, higher energy density, and prolonged cycle life, have emerged as promising candidates for next-generation energy storage technologies. In this context, sodium-ion conducting electrolytes have garnered significant attention due to their abundance in the Earth's crust, particularly when compared with lithium, the predominant material used in current battery technologies.

Lithium-ion batteries have undoubtedly revolutionized portable electronics and electrified transportation, but the scarcity and high cost of lithium resources pose challenges for widespread adoption in grid-scale energy storage. Sodium, on the other hand, is the sixth most abundant element on Earth, making up approximately 2.6% of the Earth's crust. This earth's abundance of sodium offers a compelling advantage for large-scale energy storage applications, enabling the design of cost-effective and sustainable energy storage systems to meet the growing global demand for clean and renewable energy sources. Despite the abundance of sodium resources, the development of efficient sodium-ion conducting electrolytes has been met with its own set of challenges. Notably, achieving high ionic conductivity in solid-state electrolytes is crucial to compete with the performance of traditional liquid electrolytes. Additionally, the formation of dendrites, which can lead to short circuits and reduced battery lifespan, remains a significant concern in sodium-ion battery technology.

SUMMARY

In accordance with the purpose(s) of the present disclosure, as embodied and broadly described herein, the disclosure, in one aspect, relates to the efficient and rapid synthesis of high-performance sodium ion electrolytes. The electrolytes have the general formula $Na_{u+y}N_{w-y}M_yLa_zCl_{3-v}X_v$. The electrolytes possess superionic conductivity and display a low electronic conductivity, which ensures negligible electron transport contribution to the measured total conductivity and thereby enhancing safety when applied in energy storage devices. The synthesis of the electrolytes is significantly faster when compared to the synthesis of lithium electrolytes and the process can be scalable to produce large amounts of electrolytes.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figures 9A, 9B:
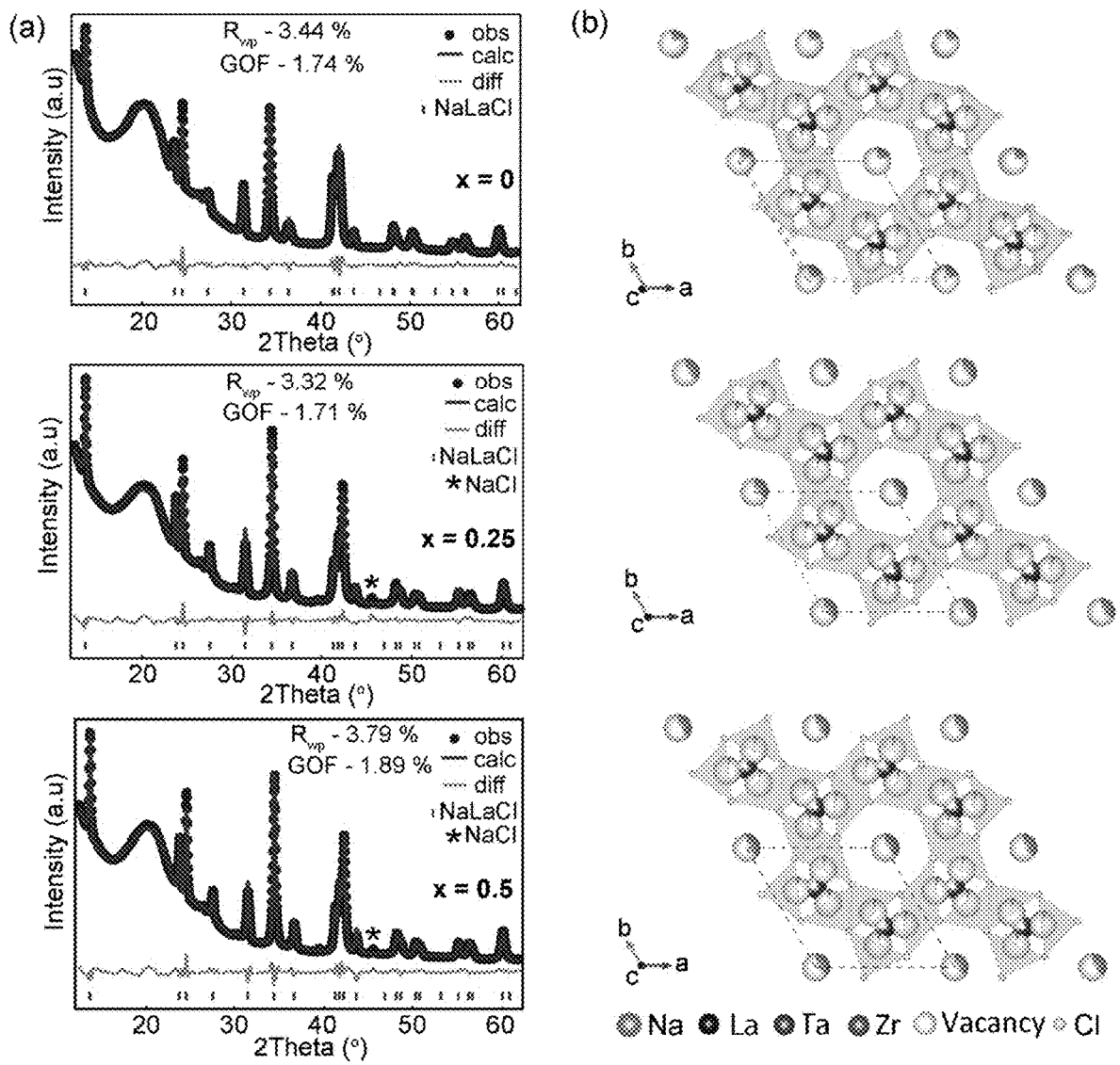

FIGS. 9A-9B show the refinement plots and derived crystal structures for other members of the $Na_{0.385-x}Ta_{0.238-x}Zr_xLa_{0.475}Cl_3$ series.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "an excipient" include, but are not limited to, mixtures or combinations of two or more such excipients, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range. Thus, for example, if a component is in an amount of about 1%, 2%, 3%, 4%, or 5%, where any value can be a lower and upper endpoint of a range, then any range is contemplated between 1% and 5% (e.g., 1% to 3%, 2% to 4%, etc.).

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Sodium Ion Electrolytes and Methods of Making and Using the Same

In one aspect, described herein is the efficient and rapid synthesis of high-performance sodium ion electrolytes. In one aspect, the electrolytes have the formula $Na_{u+y}N_{w-y}M_yLa_zCl_{3-v}X_v$, wherein N is Ta, Nb, or a combination thereof;
M is Zr, Hf, or a combination thereof;
when v is not zero, X is Br or I;
the sum $(u+y)+5(w-y)+4y+3z$ is equal to 3;
v is less than or equal to 3;
y is from about zero to 0.4; and
and z is not zero.

The method for making the electrolytes generally involves mixing a plurality of salts in varying amounts to produce electrolytes with the formula $Na_{u+y}N_{w-y}M_yLa_zCl_{3-v}X_v$. In one aspect, the salts are mixed together in a solid state. In one aspect, $NaCl$, $NCl_5$, $MCl_4$, and $LaCl_3$, where N and M are defined above are mixed together in the solid state. In the case when the electrolyte includes Br or I, NaBr and/or NaI can be added to the mixture of the salts to produce the electrolyte.

In one aspect, the salts are mixed with one another in the solid state by mechanochemical milling. Here, the mixture of salts is mixed with one or more balls in a mixing jar or container that produces a complex motion that combines back-and-forth swings with short lateral movements. In one aspect, the salts are mixed with one another for at least two hours. In another aspect, the salts are mixed with one another for less than two hours or less than one hour. In another aspect, the salts are mixed from about 15 minutes to about 45 minutes, or about 15 minutes, 20 minutes, 25 minutes, 30 minutes, 35 minutes, 40 minutes, or 45 minutes, where any value can be a lower and upper endpoint of a range (e.g., 25 minutes to 35 minutes). In one aspect, the salts are mixed in an inert atmosphere such as, for example, nitrogen or argon. In one aspect, the inert atmosphere has less than 0.5 ppm oxygen, less than 0.25 ppm oxygen, or less than 0.1 ppm oxygen.

The salts used to produce the electrolytes described herein are generally highly pure materials. In one aspect, each of the salts has a purity of greater than 99%, greater than 99.5%, or greater than 99.9%. In one aspect, each salt used to produce the electrolytes are substantially anhydrous, where each salt is at least 95% moisture free, at least 98% moisture free, at least 99% moisture free, at least 99.9% moisture free, or 100% moisture free. In another aspect, each salt has less than 0.5 ppm water, less than 0.25 ppm water, or less than 0.1 ppm water.

The Examples provide non-limiting procedures for making and characterizing the electrolytes described herein.

By varying the starting materials (i.e., salts) and amounts thereof, the properties of the electrolyte can be modified as needed. For example, N and M in $Na_{u+y}N_{w-y}M_yLa_zCl_{3-v}X_v$ can be varied with different combinations of elements. In one aspect, M is Zr and N is Ta. In another aspect, M is Zr and N is Nb. In another aspect, M is Hf and N is Ta. In another aspect, Hf and N is Nb.

In one aspect, u in $Na_{u+y}N_{w-y}M_yLa_zCl_{3-v}X_v$ is from about 0.1 to about 0.7. In another aspect, u is 0.1, 0.2, 0.3, 0.4, 0.5, 0.6, or 0.7, where any value can be a lower and upper endpoint of a range (e.g., 0.2 to 0.5).

In one aspect, w in $Na_{u+y}N_{w-y}M_yLa_zCl_{3-v}X_v$ is from about 0.04 to about 0.40. In another aspect, w is 0.04, 0.10, 0.15, 0.20, 0.25, 0.30, 0.35, or 0.40, where any value can be a lower and upper endpoint of a range (e.g., 0.10 to 0.25).

In one aspect, the sum of u+y in $Na_{u+y}N_{w-y}M_yLa_zCl_{3-v}X_v$ is from about 0.10 to about 0.75. In another aspect, the sum of u+y is 0.1, 0.2, 0.3, 0.4, 0.5, 0.6, 0.7, or 0.75, where any value can be a lower and upper endpoint of a range (e.g., 0.2 to 0.5).

In one aspect, the difference of w-y is from about 0.04 to about 0.40. In another aspect, the difference of w-y is 0.04, 0.10, 0.15, 0.20, 0.25, 0.30, 0.35, or 0.40, where any value can be a lower and upper endpoint of a range (e.g., 0.10 to 0.25).

In one aspect, y in $Na_{u+y}N_{w-y}M_yLa_zCl_{3-v}X_v$ is from about zero to about 0.41. In another aspect, y is about zero, 0.10, 0.15, 0.20, 0.25, 0.30, 0.35, or 0.41, where any value can be a lower and upper endpoint of a range (e.g., 0.10 to 0.25).

In one aspect, z in $Na_{u+y}N_{w-y}M_yLa_zCl_{3-v}X_v$ is greater than zero and less than 0.75. In another aspect, z is 0.1, 0.2, 0.3, 0.4, 0.5, 0.6, 0.7, or less than 0.75, where any value can be a lower and upper endpoint of a range (e.g., 0.2 to 0.5).

In one aspect, v in $Na_{u+y}N_{w-y}M_yLa_zCl_{3-v}X_v$ is zero. In another aspect, v is from about 0.001 to about 3.00, or 0.001, 0.01, 0.05, 0.10, 0.50, 1.00, 1.50, 2.00, 2.50, or 3.00, where any value can be a lower and upper endpoint of a range (e.g., 0.01 to 0.50). In another aspect, when v is greater than zero, X is Br.

In another aspect, the sum of u+5w+4y+3z is 3.

In one aspect, the electrolyte has the formula $Na_{u+y}Ta_{w-y}Zr_yLa_zCl_3$, wherein N is Ta and M is Zr. In another aspect, the electrolyte has the formula $Na_{u+y}Ta_{w-y}Zr_yLa_zCl_3$, wherein
u+y is from about 0.10 to about 0.75;
w-y is from about 0.04 to about 0.40;
y is from about 0.00 to about 0.40; and
z is from about 0.10 to about 0.75.

In one aspect, the electrolyte has the formula $Na_{u+y}Ta_{w-y}Zr_yLa_zCl_{3-v}Br_v$. In another aspect, the electrolyte has the formula $Na_{u+y}Ta_{w-y}Zr_yLa_zCl_{3-v}Br_v$, wherein
u+y is from about 0.10 to about 0.75;
w-y is from about 0.04 to about 0.40;
y is from about 0.00 to about 0.40;
z is from about 0.10 to about 0.75; and
v is from about 0.001 to about 3.00.

The conductive properties of the electrolytes described herein make them suitable for high-performance energy for use in sold state batteries. In one aspect, the electrolyte has an ionic conductivity of at least 1.00 mS/cm. In another aspect, the electrolyte has an ionic conductivity of at least 1.00 mS/cm to about 3.5 mS/cm, or about 1.00 mS/cm, 1.50 mS/cm, 2.00 mS/cm, 2.50 mS/cm, 3.00 mS/cm, or 3.50 mS/cm, where any value can be a lower and upper endpoint of a range (e.g., 1.50 mS/cm to 3.00 mS/cm). In another aspect, the electrolyte is conductive over a temperature range of about −20° C. to about 100° C., or about −20° C., 0° C., 20° C., 40° C., 60° C., 80° C., or 100° C., where any value can be a lower and upper endpoint of a range (e.g., 0° C. to 40° C.). Exemplary methods for determining ionic conductivity are provided in the Examples.

In one aspect, the electrolyte has an electronic conductivity less than $2.00 \times 10^{-8}$ S/cm. In another aspect, the electrolyte has an electronic conductivity of about $2.00 \times 10^{-8}$ S/cm to about $4 \times 10^{-10}$ S/cm, or about $2.00 \times 10^{-8}$ S/cm, $1.00 \times 10^{-9}$ S/cm, $5.00 \times 10^{-9}$ S/cm, $1.00 \times 10^{-10}$ S/cm, $1.50 \times 10^{-10}$ S/cm, $2.00 \times 10^{-10}$ S/cm, $2.50 \times 10^{-10}$ S/cm, $3.50 \times 10^{-10}$ S/cm, or $4.00 \times 10^{-10}$ S/cm, where any value can be a lower and upper endpoint of a range (e.g., $2.00 \times 10^{-8}$ S/cm to $5.00 \times 10^{-9}$ S/cm). Exemplary methods for determining electronic conductivity are provided in the Examples.

In some aspects, the structure of the electrolytes is a hexagonal structure in the P63/m space group. The electrolytes described herein have unique X-ray diffraction (XRD) patterns. In some aspects, XRD measurements of the electrolytes are performed using an X-ray wavelength of 1.5406 Å. The electrolytes can have an X-ray powder diffraction pattern including peaks at 31.4°, 34.4°, and 36.6°±0.5° 2θ as measured by X-ray powder diffraction using an X-ray wavelength of 1.5406 Å. In further other aspects, the electrolytes can have an X-ray powder diffraction pattern including peaks at 31.4°, 34.4°, 36.6°, and 43.6°±0.5° 2θ as measured by X-ray powder diffraction using an X-ray wavelength of 1.5406 Å. In other aspects, the electrolytes can have an X-ray powder diffraction pattern including peaks at 24.5°, 31.4°, 34.4°, 36.6°, and 43.6°±0.5° 2θ as measured by X-ray powder diffraction using an X-ray wavelength of 1.5406 Å.

As discussed above, the conductive properties of the electrolytes described herein make them suitable for high-performance energy for use in sold state batteries. Lithium-ion batteries are an essential component to portable electronics and electrified transportation, but the scarcity and high cost of lithium resources pose challenges for widespread adoption in grid-scale energy storage. Sodium, on the other hand, is the sixth most abundant element on Earth, making up approximately 2.6% of the Earth's crust. The electrolytes described herein provide a unique and viable alternative to lithium-ion batteries.

In addition to their use in batteries and energy storage systems, the electrolytes described herein have other uses. In one aspect, the electrolytes described herein can be part of a separator membrane for removing minerals and salts from water. In another aspect, since the electrolytes described herein are based on sodium, the electrolytes can be used in sensors for detecting sodium ions in solution.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Aspects

Aspect 1. A compound having the formula $Na_{u+y}N_{w-y}M_yLa_zCl_{3-v}X_v$, wherein
N is Ta, Nb, or a combination thereof;
M is Zr, Hf, or a combination thereof;
when v is not zero, X is Br or I;
the sum (u+y)+5(w−y)+4y+3z is equal to 3;
v is less than or equal to 3;
y is from about zero to 0.4; and
z is not zero.

Aspect 2. The compound of Aspect 1, wherein M is Zr and N is Ta.

Aspect 3. The compound of Aspect 1, wherein M is Zr and N is Nb.

Aspect 4. The compound of Aspect 1, wherein M is Hf and N is Ta.

Aspect 5. The compound of Aspect 1, wherein M is Hf and N is Nb.

Aspect 6. The compound of any one of Aspects 1-5, wherein u is from about 0.1 to about 0.7.

Aspect 7. The compound of any one of Aspects 1-6, wherein w is from about 0.04 to about 0.40.

Aspect 8. The compound of any one of Aspects 1-7, wherein the sum of u+y is from about 0.10 to about 0.75.

Aspect 9. The compound of any one of Aspects 1-8, wherein the difference of w−y is from about 0.04 to about 0.40.

Aspect 10. The compound of any one of Aspects 1-9, wherein y is from about 0.0 to about less than 0.41.

Aspect 11. The compound of any one of Aspects 1-10, wherein z is greater than zero and less than 0.75.

Aspect 12. The compound of any one of Aspects 1-10, wherein v is zero.

Aspect 13. The compound of any one of Aspects 1-10, wherein v is from about 0.001 to about 3.00.

Aspect 14. The compound of any one of Aspects 1-10, wherein when v is greater than zero, X is Br.

Aspect 15. The compound of Aspect 1, where the compound has the formula $Na_{u+y}N_{w-y}M_yLa_zCl_3$, wherein N is Ta and M is Zr.

Aspect 16. The compound of Aspect 15, wherein
u+y is from about 0.10 to about 0.75;
w−y is from about 0.04 to about 0.40;
y is from about 0.00 to about 0.40; and
z is from about 0.10 to about 0.75.

Aspect 17. The compound of Aspect 1, where the compound has the formula $Na_{u+y}N_{w-y}M_yLa_zCl_{3-v}X_v$, wherein N is Ta, M is Zr, and X is Br.

Aspect 18. The compound of Aspect 17, wherein
u+y is from about 0.10 to about 0.75;
w−y is from about 0.04 to about 0.40;
y is from about 0.00 to about 0.40;
z is from about 0.10 to about 0.75; and
v is from about 0.001 to about 3.00.

Aspect 19. The compound of any one of Aspects 1-18, wherein the compound has a hexagonal structure in the P63/m space group.

Aspect 20. The compound of any one of Aspects 1-19, wherein the compound has an X-ray powder diffraction pattern comprising peaks at 31.4°, 34.4°, and 36.6°±0.5° 2θ as measured by X-ray powder diffraction using an X-ray wavelength of 1.5406 Å.

Aspect 21. The compound of any one of Aspects 1-19, wherein the compound has an X-ray powder diffraction pattern comprising peaks at 31.4°, 34.4°, 36.6°, and 43.6°±0.5° 2θ as measured by X-ray powder diffraction using an X-ray wavelength of 1.5406 Å.

Aspect 22. The compound of any one of Aspects 1-19, wherein the compound has an X-ray powder diffraction pattern comprising peaks at 24.5°, 31.4°, 34.4°, 36.6°, and 43.6°±0.5° 2θ as measured by X-ray powder diffraction using an X-ray wavelength of 1.5406 Å.

Aspect 23. The compound of any one of Aspects 1-22, wherein the compound has an ionic conductivity of at least 1.00 mS/cm.

Aspect 24. The compound of any one of Aspects 1-22, wherein the compound has an ionic conductivity of at least 1.00 mS/cm to about 3.5 mS/cm.

Aspect 25. The compound of any one of Aspects 1-24, wherein the compound has an electronic conductivity less than $2.00 \times 10^{-8}$ S/cm.

Aspect 26. The compound of any one of Aspects 1-24, wherein the compound has an electronic conductivity of about $2.00 \times 10^{-8}$ S/cm to about $4 \times 10^{-10}$ S/cm.

Aspect 27. The compound of any one of Aspects 1-26, wherein the compound is conductive over a temperature range of about −20° C. to about 100° C.

Aspect 28. A method for making a compound having the formula $Na_{u+y}N_{w-y}M_yLa_zCl_{3-v}X_v$, wherein
N is Ta, Nb, or a combination thereof;
M is Zr, Hf, or a combination thereof;
when v is not zero, X is Br or I;
the sum (u+y)+5(w−y)+4y+3z is equal to 3;
v is less than or equal to 3;
y is from 0.0 to about 0.4 and
z is not zero,
the method comprising mixing in the solid state NaCl, $NCl_5$, $MCl_4$, $LaCl_3$, and optionally NaBr or NaI.

Aspect 29. The method of Aspect 28, wherein NaCl, $NCl_5$, $MCl_4$, $LaCl_3$, and optionally NaBr or NaI are substantially anhydrous.

Aspect 30. The method of Aspect 28 or 29, wherein NaCl, $NCl_5$, $MCl_4$, $LaCl_3$, and optionally NaBr or NaI are mixed for at least two hours.

Aspect 31. The method of Aspect 28 or 29, wherein NaCl, $NCl_5$, $MCl_4$, $LaCl_3$, and optionally NaBr or NaI are mixed for less than two hours.

Aspect 32. The method of Aspect 28 or 29, wherein NaCl, $NCl_5$, $MCl_4$, $LaCl_3$, and optionally NaBr or NaI are mixed for less than one hour.

Aspect 33. The method of Aspect 28 or 29, wherein NaCl, NCl$_5$, MCl$_4$, LaCl$_3$, and optionally NaBr or NaI are mixed from about 15 minutes to about 45 minutes.

Aspect 34. The method of any one of Aspects 28-33, wherein NaCl, NCl$_5$, MCl$_4$, LaCl$_3$, and optionally NaBr or NaI are mixed by mechanochemical milling.

Aspect 35. The method of any one of Aspects 28-34, wherein NaCl, NCl$_5$, MCl$_4$, LaCl$_3$, and optionally NaBr or NaI are mixed in an inert atmosphere.

Aspect 36. A compound produced by the method of any one of Aspects 28-35.

Aspect 37. A battery comprising the compound in any one of Aspects 1-27 and 36.

Aspect 38. The battery of Aspect 33, wherein the battery is a solid state battery.

Aspect 39. A separator membrane comprising the compound in any one of Aspects 1-27 and 36.

Aspect 40. A sensor comprising the compound in any one of Aspects 1-27 and 36.

Examples

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in °C. or is at ambient temperature, and pressure.

Materials and Methods

Synthesis

Sodium chloride (99.9% Sigma Aldrich) and sodium bromide (99.9% Sigma Aldrich) were initially dried at 200° C. dynamic vacuum for 12 hours to remove moisture and thereafter stored in an argon-filled glovebox (VTI). Anhydrous LaCl$_3$ (99.9% Alfa Aesar), ZrCl$_4$, and TaCl$_5$ were all stored in the argon-filled glovebox, with moisture and O$_2$ contents of <0.1 ppm each, to avoid moisture and ambient environment. A stoichiometric amount of the precursors was hand-ground for about 5 minutes using an agate mortar and pestle to obtain a homogenous powder. The homogenous mixture was then quantitatively transferred into a 20 mL zirconia milling jar, with three 10 mm-sized zirconia balls, and vacuum sealed within the argon-filled glovebox. Mechanochemical milling was done using the 8000M Mixer/Mill® High-Energy Ball Mill for 30 minutes. The mechanically homogenized sample was stored in a glass vial inside the argon-filled glovebox (MBroun) for further characterization.

Characterization

Powder X-ray Diffraction—Prepared sample was sealed on a zero-background sample holder with Kapton film. The sample was analyzed in a Rigaku SmartLab X-ray diffractometer with a Cu source. A wavelength of 1.5406 Å and a range of 2θ values from 10° to 70° were used.

Electrochemical Impedance Spectroscopy (EIS)—For impedance measurements, the sample was ground properly and pressed in a 10 mm diameter mold to make a ~0.8 mm thick pellet. The pellet was assembled in a split cell with steel as the blocking electrode. The measurement of potentiostatic EIS was carried out using a Gamry electrochemical analyzer and conductivities were calculated from the resulting Nyquist plots. Variable temperature EIS characterization was performed from −20° C. to 100° C. to calculate the activation energy via Arrhenius plots.

Solid-State NMR—$^{23}$Na Magic-Angle-Spinning solid-state (MAS NMR) experiments were performed using a Bruker Avance-III 500 spectrometer with an Ultrashield 500 MHz wide-bore magnet with a field of 11.74 T and at a Larmor frequency of 132.3 MHz. The sample powders were packed into 2.5 mm rotors made of ZrO$_2$ under argon. The MAS rate was 25 kHz. Single pulse NMR experiments were performed with π/2 pulse lengths of 3.7 µs and a recycle delay of 50 s. Inversion recovery $^{23}$Na T$_1$ measurements were conducted for NTLZC. Solid NaCl was used as a chemical shift reference at 0.04 ppm.

Bond Valence Site Energy (BVSE) Calculations—Na ion diffusion pathways in NTLZC were estimated utilizing the SoftBV V131 program, with a resolution of 0.1 Å and an auto-calculated screening factor of 0.657031.

Results and Discussion

Figure 1A:
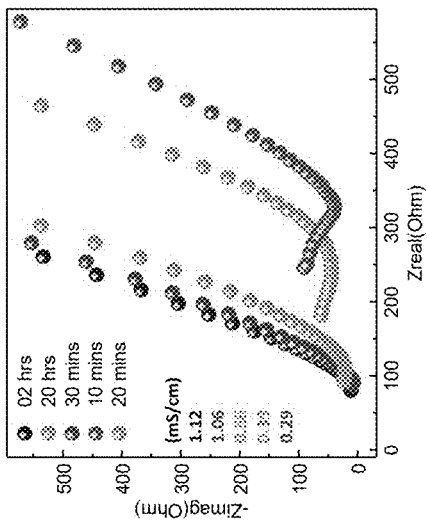
FIGS. 1A-1F show (a) Nyquist plot from EIS measurements showing ionic conductivities of NTLZC prepared via mechanochemical synthesis with different milling times and (b) at different temperatures for 30 minutes milled sample. (c) Arrhenius-like plot for NTLZC showing a low activation energy barrier (calculated from the slope), indicative of fast ion motion. (d) DC-Polarization on symmetric steel/SE/steel cell for determination of electronic conductivity. (e) Four different voltages were employed, and the electronic conductivity of $2.50 \times 10^{-10}$ S/cm was extracted from the slope of the current Vs. voltage plot. An equilibration time of 4 hrs was employed in this experiment. (f) Bromine-doped NTLZC with low impedance value.

NTLZC material showed fast ion conductivity even at a total synthesis time as low as 20 minutes (FIG. 1A). A milling time of 30 mins and 2 hrs gave almost similar impedance values. An optimum ionic conductivity of 1.07 mS/cm and 1.10 mS/cm was determined for the 30 mins (NTLZC-30) and 2 hrs (NTLZC-2h) ball milled samples, respectively. A further extension of milling time to 20 hrs. resulted in a drop of Na ion conductivity to ca. 0.39 mS/cm, this is due to the more strain formation and reduction in particle size, making the sample more amorphous which does not benefit fast ion motion for this material class. Ball milling generates heat within the sample, and some partial reaction may occur at extended milling time culminating in a deviation from the super-conducting phase derived at lesser milling times.

Figure 1B:
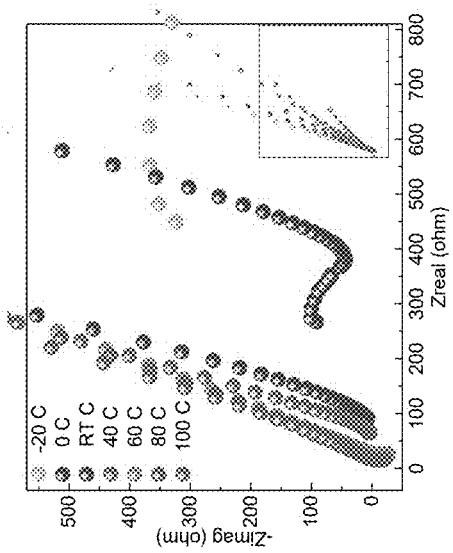
Figure 1C:
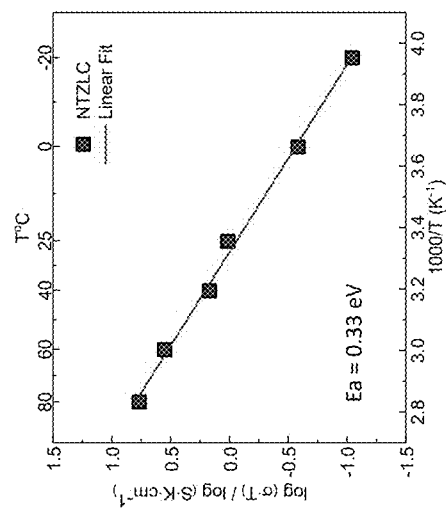
Figure 1D:
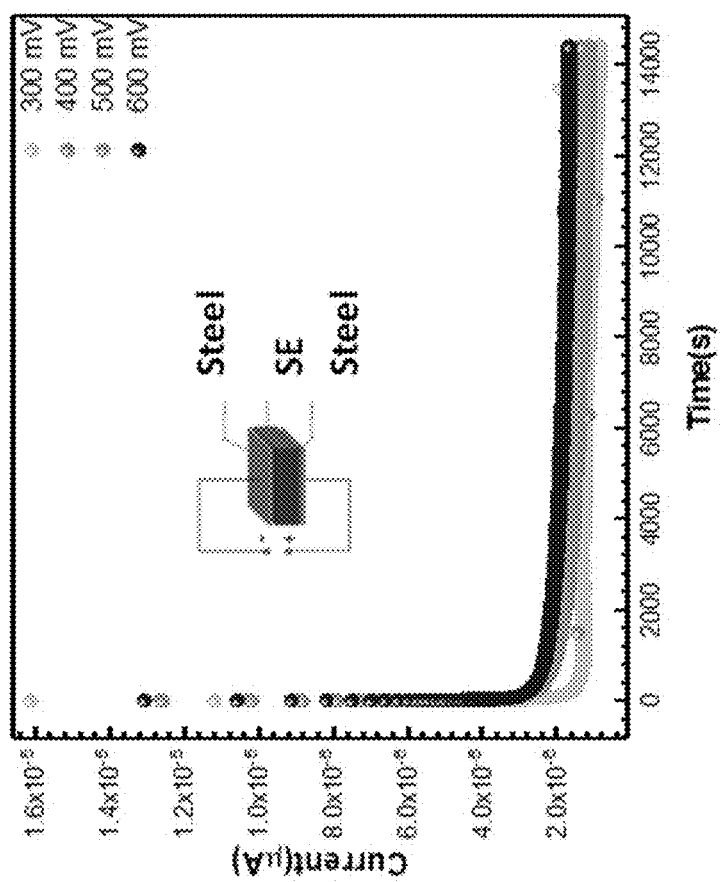

Variable temperature conductivity measurements with EIS (VT-EIS) were conducted on the NTLZC-30 sample. Results show the new solid electrolyte has a wide operational temperature range as conductivity values recorded at low (−20 C) and high (100 C) temperatures (FIG. 1B) indicate stable operations and sustained Na ion motion within the electrolyte. Notably, upon cooling down to room temperature, the solid electrolyte retained its fast ion conduction properties, and no physical degradation was observed. A plot of the conductivities obtained at the different temperatures vs. inverse temperature (T$^{-1}$) in kelvin (FIG. 1C) was fitted with a linear function and the activation energy was estimated to be ca. 0.33 eV from the slope using an Arrhenius-like type equation. This low activation energy value partly explains the superionic property observed for the SE, as the energy penalty required for Li jumps from one site to the other is appreciably minimal. FIG. 1D shows a plot of current vs. time used to determine the DC (Direct Current) electronic conductivity of NTLZC-30 at 250 mV.

A low electronic conductivity value of 1.74×10$^{-8}$ S/cm was obtained, suggesting an insignificant contribution of electron transport to the calculated ionic conductivity and a lesser probability of dendrite formation within the SE which often leads to cell short-circuiting.

Figure 1E:
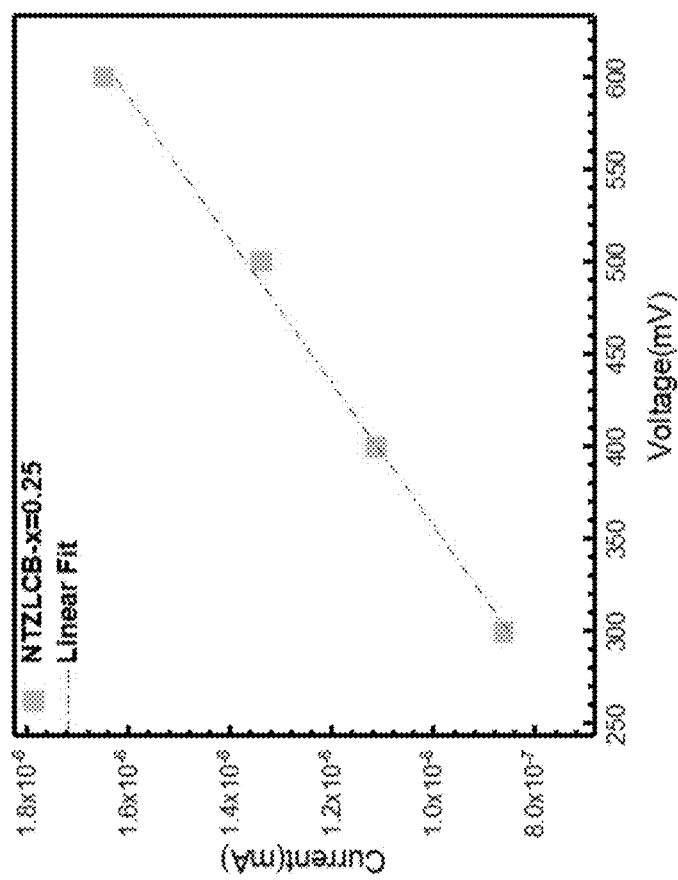
Figure 1F:
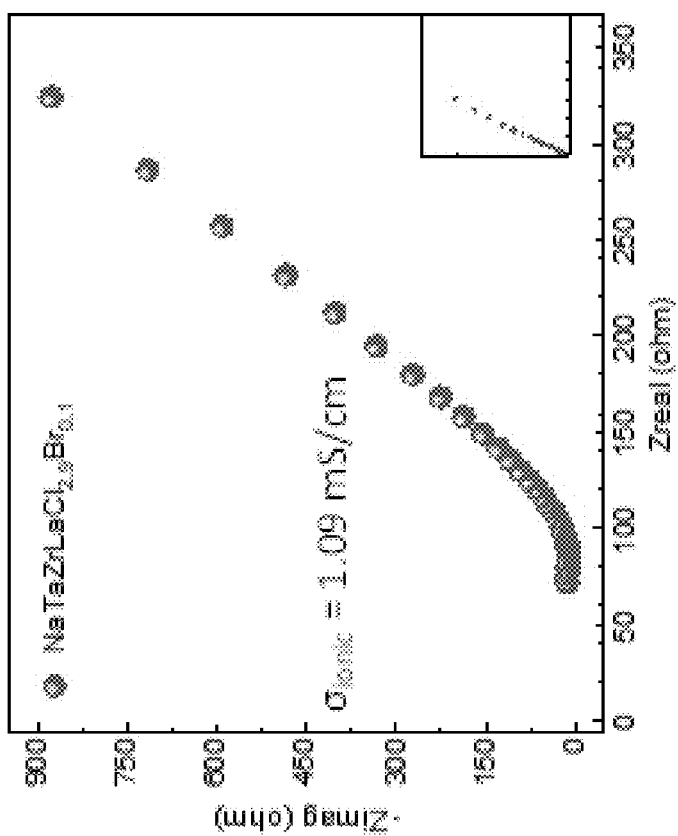

It is also reported for the first time, bromine substituted NTZLC composition—NTLZCl$_{2.9}$Br$_{0.1}$ (FIG. 1E), which also gave a room temperature conductivity of 1.05 mS/cm, this suggests that the structure can tolerate the larger Br anions just as well, which may help to tune the ionic conductivity by providing more volumes for ion migration.

Figure 2:
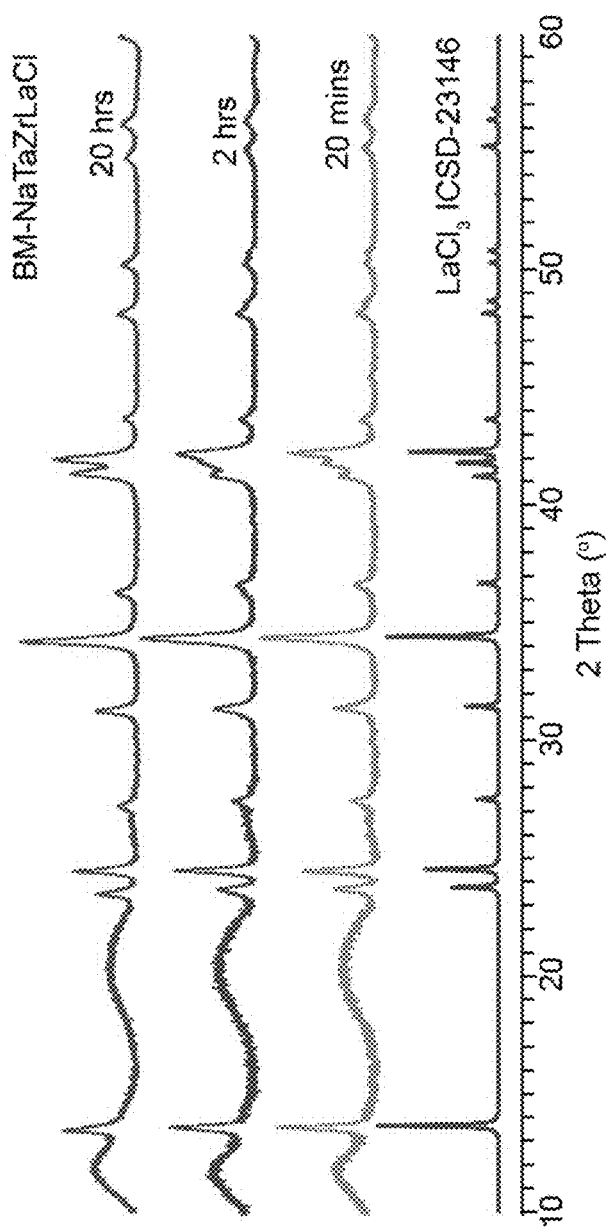
FIG. 2 shows the PXRD Pattern of NTLZC Prepared with different milling times. A near perfect match of the diffraction peaks relative to the parent $LaCl_3$ crystal structure (Hexagonal, P63/m) is observed even after just 30 mins ball milling.

The newly developed Na ion solid electrolyte crystallizes in the hexagonal crystal structure with the P63/m space group. This is illustrated in the diffraction patterns shown in FIG. 2, the NTLZC-30 peaks exactly match the diffractogram of $LaCl_3$ (P63/m)—the base structure from which the NTLZC SE is derived. A similar crystal structure was also reported for $Li_{0.388}Ta_{0.238}La_{0.475}Cl_3$ by Yin and co-workers. Importantly, we report the formation of the highly conducting phase after only 20 and 30 minutes of synthesis (FIG. 2). As the milling time approaches 20 hrs. we observe a slight broadening of the diffraction peaks and even overlaps, for example, peaks at ~44°, where three peaks merge to become two. This is probably due to a more amorphous phase and the onset of phase transitions. The optimum milling time was pegged at 30 mins.

Figures 5A, 5B, 5C, 5D:
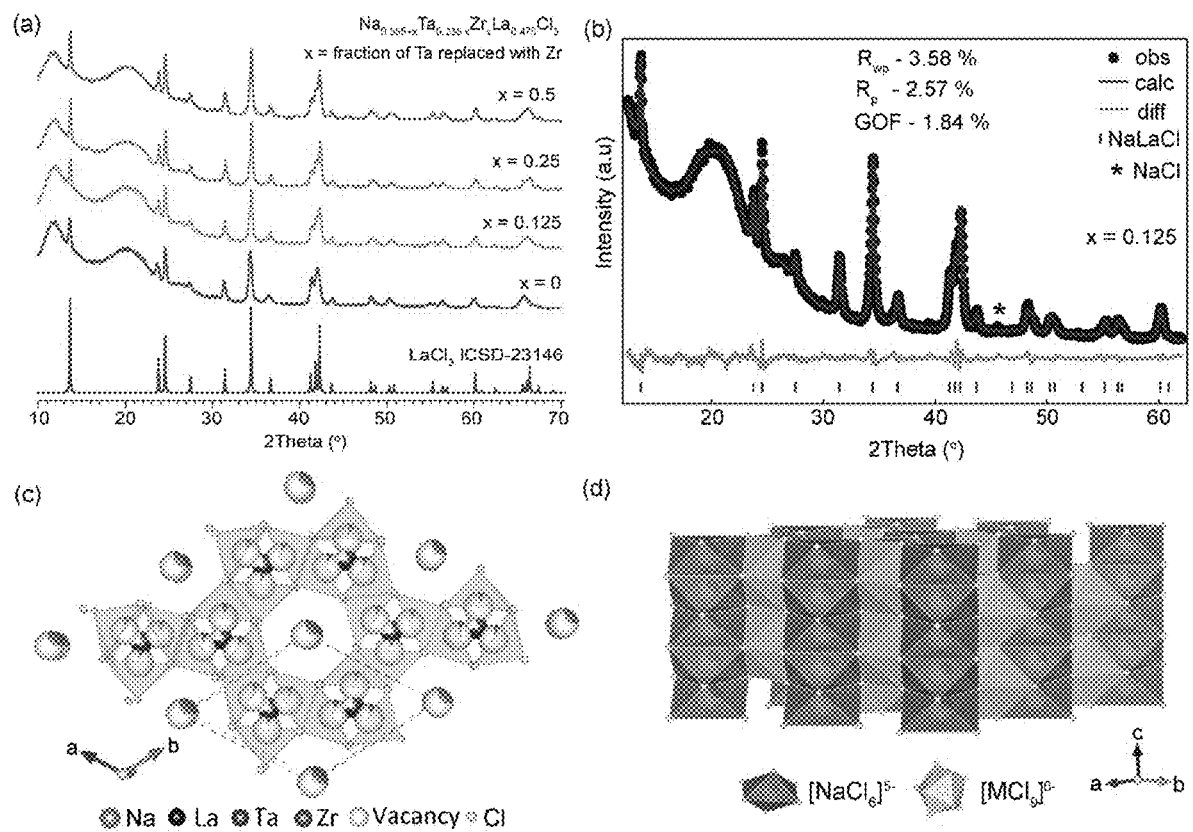
FIGS. 5A-5D show the structural analysis of $Na_{0.385-x}Ta_{0.238-x}Zr_xLa_{0.475}Cl_3$ series (a) X-ray diffraction plots, (b) representative Rietveld refinement plot, the pattern can be fitted to a hexagonal crystal system, space group: P63/m. (c,d) Crystal structures viewed from different orientations.

FIG. 5a shows the XRD patterns of four members of the NTLZC series with incremental mol % Ta (x) replaced with Zr. An x=0%, 12.5%, 25%, 50% corresponds approximately to $Na_{0.385}Ta_{0.238}La_{0.475}Cl_3$, $Na_{0.415}Ta_{0.208}Zr_{0.03}La_{0.475}Cl_3$, $Na_{0.448}Ta_{0.179}Zr_{0.06}La_{0.475}Cl_3$ and $Na_{0.504}Ta_{0.119}Zr_{0.119}La_{0.475}Cl_3$ compositions respectively. The refinement of the diffraction pattern (using $Na_{0.415}Ta_{0.208}Zr_{0.03}La_{0.475}Cl_3$) shows the material crystallizes in the P63/m space group based on the $LaCl_3$ crystal structure FIG. 5B. The refined crystal structure is displayed in FIGS. 5C-5D.

Figures 3A, 3B:
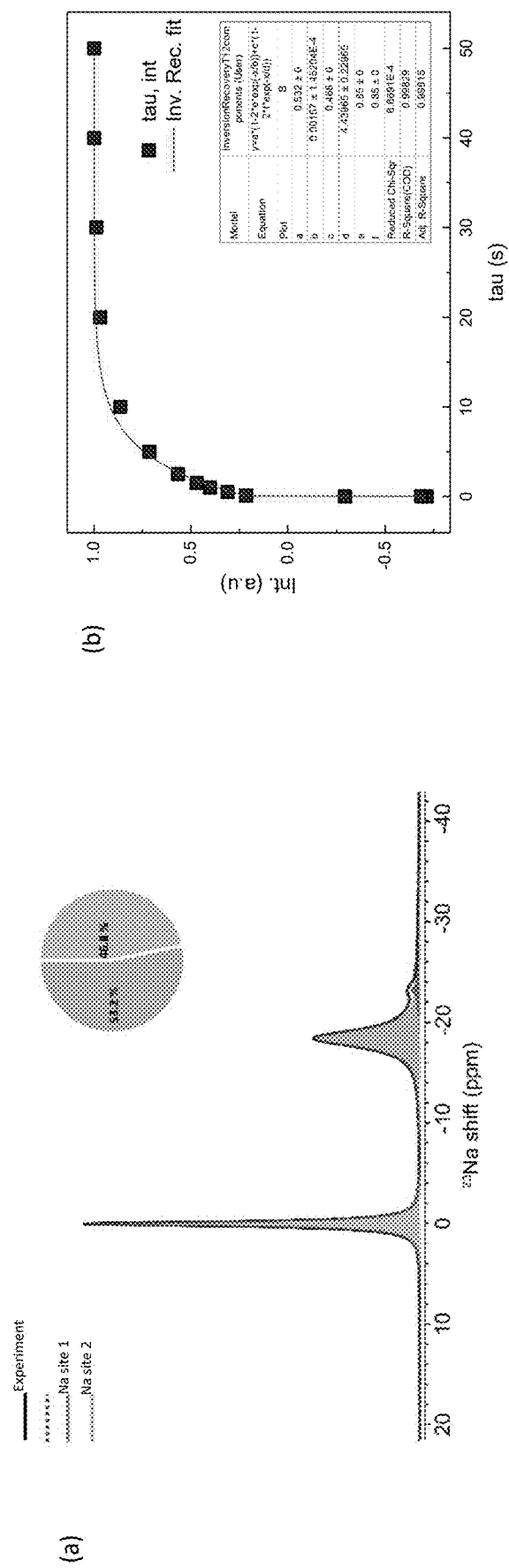
FIGS. 3A-3B show the $^{23}Na$ NMR spectra deconvolution shows two distinct Na sites (a), and RT $^{23}Na$ spin-lattice relaxation time ($T_1$) using the inversion recovery method (b) for NTLZC-30.

Solid-state NMR is important for the studies of disordered materials because it does not rely on long-range structural order. NMR can non-destructively probe the local structural environment as well as assess constituent species' diffusion processes and ion dynamics within the crystal framework. Magic angle spinning (MAS) solid-state NMR obtained for our sample (FIG. 3A) show two distinct $^{23}Na$ local environments at around 0 ppm (green) and −19 ppm (blue). We have tentatively assigned the 0 ppm peaks as Na2 sites near the $LaCl_9$ polyhedron, surrounded by more chlorine anions and hence more deshielded—towards the right or downfield. Whereas the peak at −19 ppm is temporarily assigned as Na1 in the channel sites, which move almost unhindered along the c-direction in a more shielded (lesser surrounding anions) local environment. The tiny blue peak beyond 21 ppm is proposed to be Na1 channel sites with some degree of distortions.

Figures 6A, 6B, 6C, 6D:
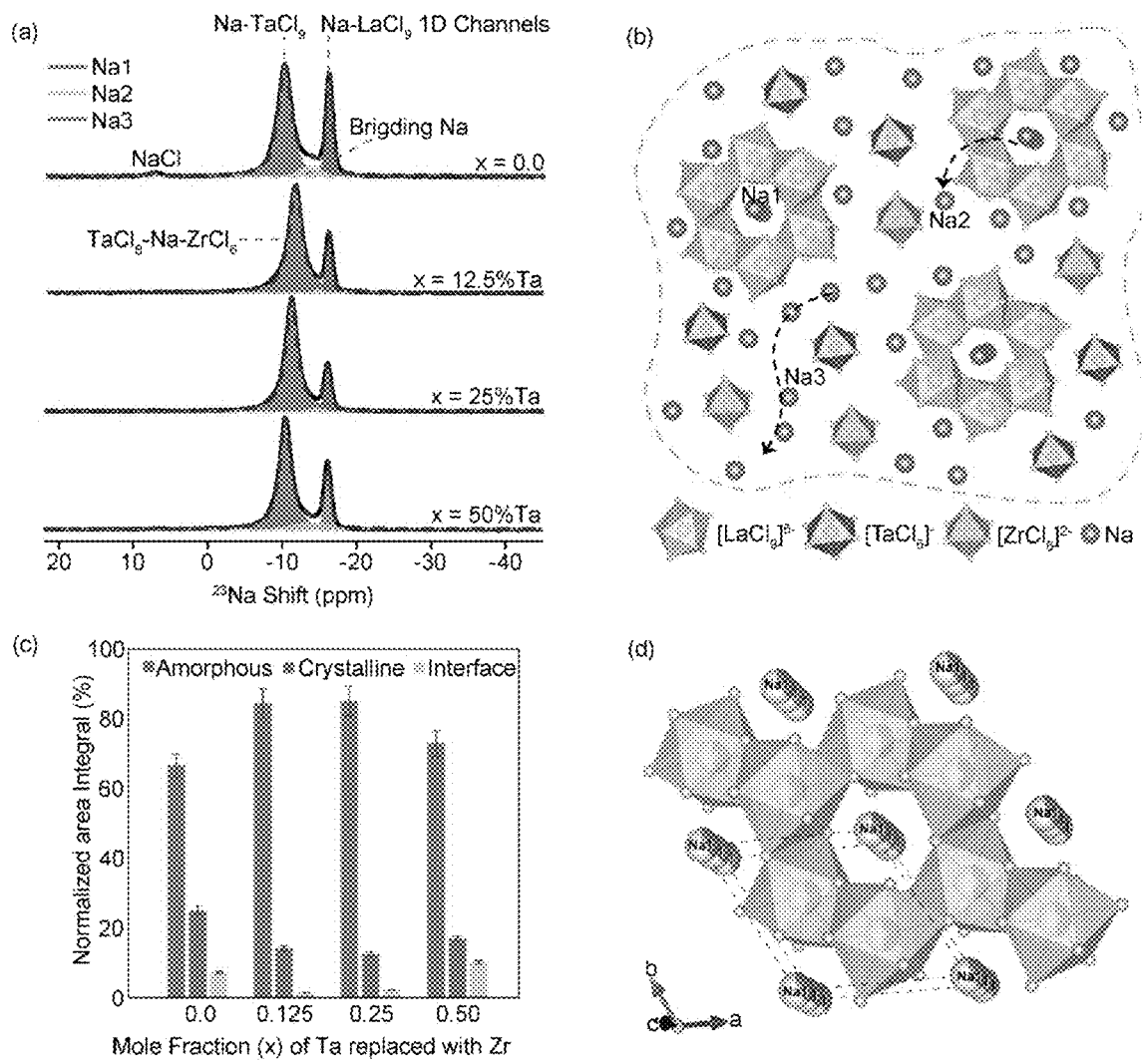
FIGS. 6A-6D show (a) NMR spectra of the NTLZC series show the crystalline, amorphous, and interfacial local environments. (b) An illustration of the three local environments (c) Normalized weight fractions of Na ion in the local environments (d) Crystal structure of NTLZC showing fast 1 D Na ion diffusion.

Local structure analysis using solid-state NMR shows three kinds of Na environments, which are tentatively assigned to the crystalline (brown), amorphous (blue), and bridging (yellow) phases (FIG. 6A). This suggests that the material is not a purely crystalline solid solution as seen from XRD but contains a considerable amount of amorphous phase. FIGS. 6B and 6D illustrate the motional behavior of Na ions characterized by a fast 1 D diffusion along the c-direction. The role of the amorphous matrix is to connect the different crystalline frameworks and channel the diffusing Na ions along multiple dimensions (3D), making macroscopic Na ion conduction possible.

The spin-lattice relaxation rate constant in the lab frame ($T_1$) was obtained using the inversion recovery method (FIG. 3B) at room temperature. $T_1$ measurements provide insights into $Na^+$ dynamics on the MHz frequency scale. The relaxation time is an indicator of the motional rates of mobile species. According to the Bloembergen-Purcell-Pound (BPP) theory, a lower $T_1$ broadly connotes a faster ion motion or jump rates with a given system. A $T_1$ of 1.67 ms and 4.44 s were derived for the Na1 and Na2 sites respectively, corresponding to a much faster $Na^+$ motion in the Na1 channel sites.

Figure 7:
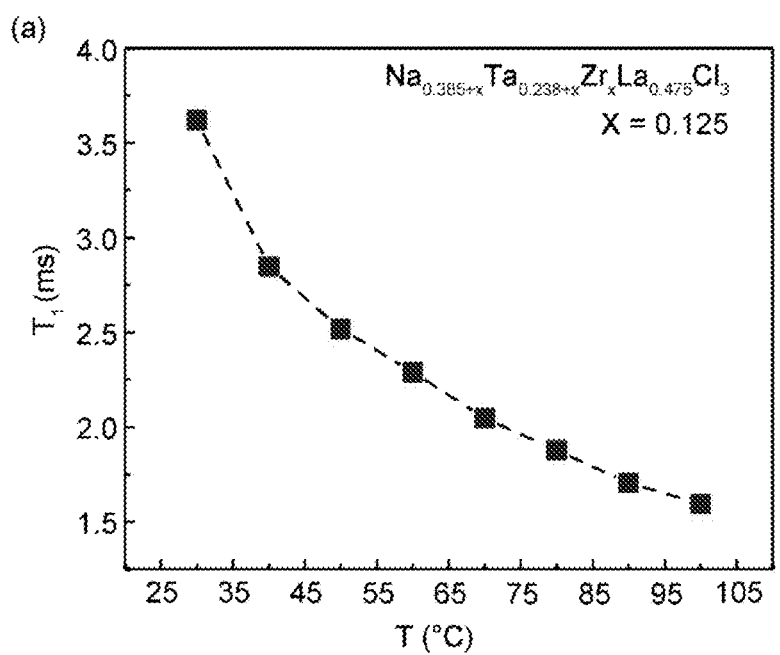
FIG. 7 shows $^{23}Na$ $T_1$ spin-lattice relaxation plots at variable temperature.

FIG. 7 shows a decreasing $T_1$ value with increasing temperature, indicating that the material's Na ion mobility lies in the slow to intermediate motion regime, according to the BPP theory.

The bond valence site energy calculation provides a straightforward and direct method to predict ion movement within crystal structures. This method relies on the postulation that an atom's oxidation state is equal to the sum of all its associated bond valences. For $Na^+$ ion migration, the preferred pathway is along directions of minimum bond valence sums mismatch ($|\Delta V|$), which is quantified in arbitrary valence units. To convert this valence sum discrepancy into an absolute energy scale, a combination of Morse-type interaction and Coulombic repulsion is employed.

Figure 4A:
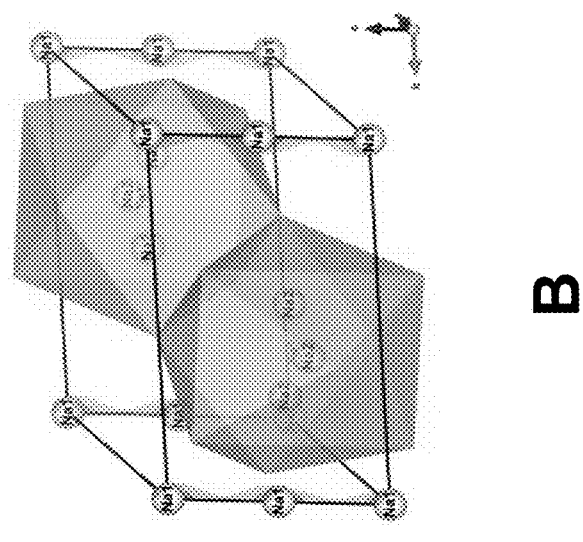
FIGS. 4A-4B show (a) BVSE calculations for NTLZC showing the possible diffusion pathways for Na ions in NTLZC (b) structure of NTLZC obtained from SoftBV showing isosurfaces which depict most probable paths for Na ions diffusion in NTLZC.
Figure 4B:
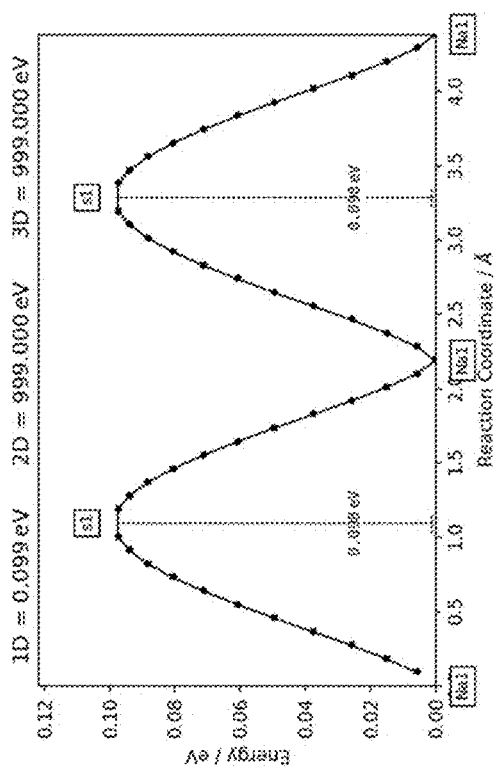

Preliminary calculations of the preferred Na ion migration paths derived from bond valence site energy analysis point to a super-fast 1 D percolating network in the NTLZC structure. The determined threshold energy barrier for Na ion jumps between face-shared octahedral Na1 sites along the c-direction is 0.098 eV. This low migration enthalpy value suggests a possibility of achieving fast Na ion conduction even at low temperatures. The Na2 sites are estimated to be near the tricapped trigonal prisms of $LaCl_9$ channels (gold polyhedral, FIG. 4B), and we expect a bridging or exchange between the Na1 and Na2 sites, making for a 3D diffusion, similar to a previous study on a similar structure. So far, we have been able to show evidence of a rapid 1 D diffusion of mobile Na ions in the Na1 sites along the c-direction only, this trajectory is displayed as blue isosurfaces in FIG. 4B.

Figures 8A, 8B, 8C, 8D:
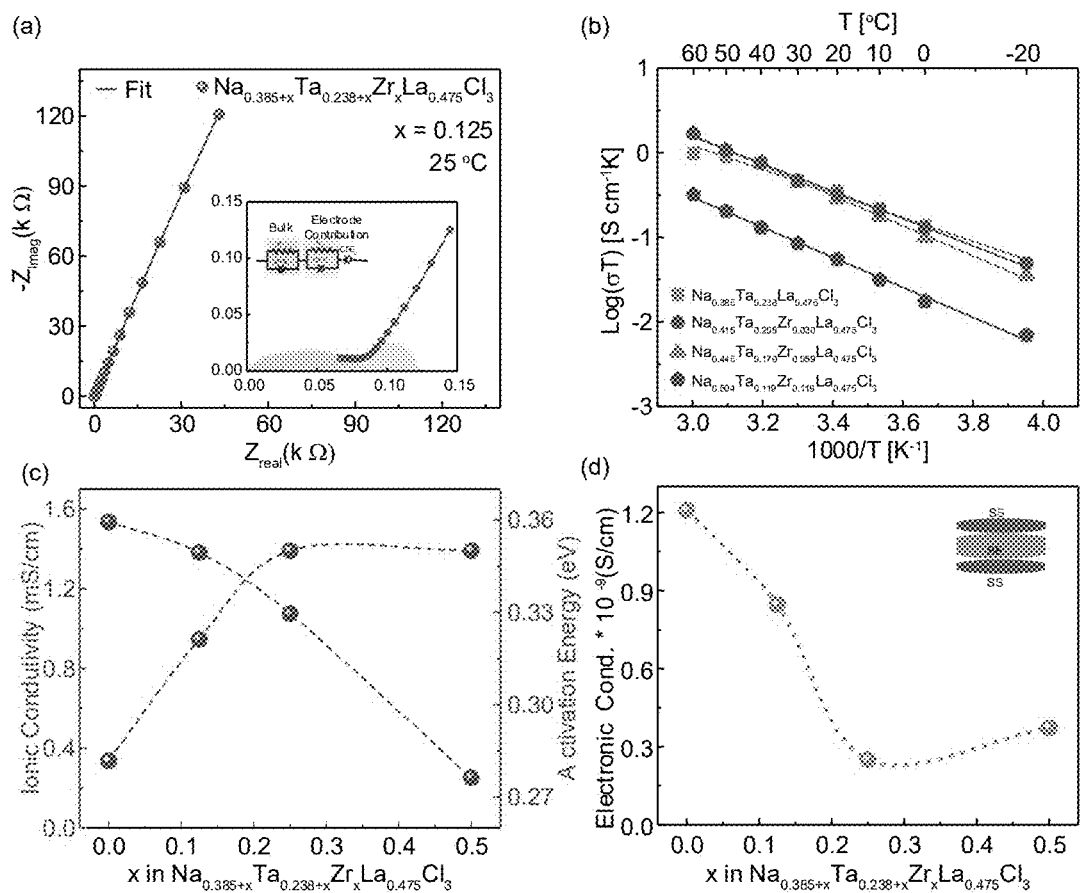
FIGS. 8A-8D show (a) Nyquist plot for NTLZC fitted at RT (b) Arrhenius-like plots for NTLZC for deriving the activation energy barrier (c) Representative plot of the ionic conductivities and activation energies for the series (d) Results of DC-polarization on a symmetric steel/NTLZC/ steel cell for determining electronic conductivity show negligible electron-transport property.

The ionic conductivity and activation energy values derived from FIGS. 8A and 8B respectively are plotted in FIG. 8C. Superionic conductivity values of 1.50, 1.38, and 1.07 mS/cm are observed for $Na_{0.385}Ta_{0.238}La_{0.475}Cl_3$, $Na_{0.415}Ta_{0.208}Zr_{0.003}La_{0.475}Cl_3$ and, $Na_{0.448}Ta_{0.179}Zr_{0.06}La_{0.475}Cl_3$ respectively. This drops to 0.25 mS/cm for x=50% Ta replacement with Zr. The measured activation energy correlates strongly with the ionic conductivity values. Activation energy increases (ranging from 0.28 to 0.35 eV) with decreasing ionic conductivity. A remarkable decrease in electronic conduction is observed with an increase in Zr (FIG. 8D). $Na_{0.448}Ta_{0.179}Zr_{0.06}La_{0.475}Cl_3$ exhibited the lowest electronic conductivity of around $2.8 \times 10^{-10}$ S/cm. Low electronic conduction mitigates electrolyte degradation, dendrite formation, and short circuits.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES (1) Janek, J.; Zeier, W. G. Challenges in Speeding up Solid-State Battery Development. Nature Energy. Nature Research 2023. doi:10.1038/s41560-023-01208-9.
(2) Janek, J.; Zeier, W. G. A Solid Future for Battery Development. Nature Energy. Nature Publishing Group Sep. 8, 2016. doi:10.1038/nenergy.2016.141.

(3) Chi, X.; Zhang, Y.; Hao, F.; Kmiec, S.; Dong, H.; Xu, R.; Zhao, K.; Ai, Q.; Terlier, T.; Wang, L.; Zhao, L.; Guo, L.; Lou, J.; Xin, H. L.; Martin, S. W.; Yao, Y. An Electrochemically Stable Homogeneous Glassy Electrolyte Formed at Room Temperature for All-Solid-State Sodium Batteries. Nat Commun 2022, 13 (1). doi:10.1038/s41467-022-30517-y.

(4) Ohno, S.; Zeier, W. G. Sodium Is the New Lithium. Nature Energy. Nature Research Aug. 1, 2022, pp 686-687. doi:10.1038/s41560-022-01084-9.

(5) Yin, Y. C.; Yang, J. T.; Luo, J. Da; Lu, G. X.; Huang, Z.; Wang, J. P.; Li, P.; Li, F.; Wu, Y. C.; Tian, T.; Meng, Y. F.; Mo, H. S.; Song, Y. H.; Yang, J. N.; Feng, L. Z.; Ma, T.; Wen, W.; Gong, K.; Wang, L. J.; Ju, H. X.; Xiao, Y.; Li, Z.; Tao, X.; Yao, H. Bin. A LaCl3-Based Lithium Superionic Conductor Compatible with Lithium Metal. Nature 2023, 616 (7955), 77-83. doi:10.1038/s41586-023-05899-8.

(6) Wu, E. A.; Banerjee, S.; Tang, H.; Richardson, P. M.; Doux, J. M.; Qi, J.; Zhu, Z.; Grenier, A.; Li, Y.; Zhao, E.; Deysher, G.; Sebti, E.; Nguyen, H.; Stephens, R.; Verbist, G.; Chapman, K. W.; Clement, R. J.; Banerjee, A.; Meng, Y. S.; Ong, S. P. A Stable Cathode-Solid Electrolyte Composite for High-Voltage, Long-Cycle-Life Solid-State Sodium-Ion Batteries. Nat Commun 2021, 12 (1). doi:10.1038/s41467-021-21488-7.

(7) Wong, L. L.; Phuah, K. C.; Dai, R.; Chen, H.; Chew, W. S.; Adams, S. Bond Valence Pathway Analyzer—An Automatic Rapid Screening Tool for Fast Ion Conductors within SoftBV. Chemistry of Materials 2021, 33 (2), 625-641. doi:10.1021/acs.chemmater.0c03893.

(8) Adams, S. From Bond Valence Maps to Energy Landscapes for Mobile Ions in Ion-Conducting Solids. Solid State Ion 2006, 177 (19-25 SPEC. ISS.), 1625-1630. doi:10.1016/j.ssi.2006.03.054.

(9) Schlem, R.; Burmeister, C. F.; Michalowski, P.; Ohno, S.; Dewald, G. F.; Kwade, A.; Zeier, W. G. Energy Storage Materials for Solid-State Batteries: Design by Mechanochemistry. Advanced Energy Materials. John Wiley and Sons Inc Aug. 1, 2021. doi:10.1002/aenm.202101022.

(10) Famprikis, T.; Kudu, O. U.; Dawson, J. A.; Canepa, P.; Fauth, F.; Suard, E.; Zbiri, M.; Dambournet, D.; Borkiewicz, O. J.; Bouyanfif, H.; Emge, S. P.; Cretu, S.; Chotard, J. N.; Grey, C. P.; Zeier, W. G.; Islam, M. S.; Masquelier, C. Under Pressure: Mechanochemical Effects on Structure and Ion Conduction in the Sodium-Ion Solid Electrolyte Na3PS4. J Am Chem Soc 2020, 142 (43), 18422-18436. doi:10.1021/jacs.0c06668.

(11) Duff, B. B.; Elliott, S. J.; Gamon, J.; Daniels, L. M.; Rosseinsky, M. J.; Blanc, F. Toward Understanding of the Li-Ion Migration Pathways in the Lithium Aluminum Sulfides Li3AlS3 and Li4.3AlS3.3Cl0.7 via 6,7Li Solid-State Nuclear Magnetic Resonance Spectroscopy. Chemistry of Materials 2023, 35 (1), 27-40.

(12) Stöffler, H.; Zinkevich, T.; Yavuz, M.; Senyshyn, A.; Kulisch, J.; Hartmann, P.; Adermann, T.; Randau, S.; Richter, F. H.; Janek, J.; Indris, S.; Ehrenberg, H. Li+-Ion Dynamics in β-Li3PS4 Observed by NMR: Local Hopping and Long-Range Transport. Journal of Physical Chemistry C 2018, 122 (28), 15954-15965. doi:10.1021/acs.jpcc.8b05431.

(13) Uitz, M.; Epp, V.; Bottke, P.; Wilkening, M. Ion Dynamics in Solid Electrolytes for Lithium Batteries: Probing Jump Rates and Activation Energies through Time-Domain Li NMR. J Electroceram 2017, 38 (2-4), 142-156. doi:10.1007/s10832-017-0071-4.

(14) Reif, B.; Ashbrook, S. E.; Emsley, L.; Hong, M. Solid-State NMR Spectroscopy. Nature Reviews Methods Primers. Springer Nature Dec. 1, 2021. doi:10.1038/s43586-020-00002-1.

(15) Heitjans, P.; Indris, S.; Wilkening, M. Solid-State Diffusion and NMR; 2005.

(16) Pecher, O.; Carretero-Gonzalez, J.; Griffith, K. J.; Grey, C. P. Materials' Methods: NMR in Battery Research. Chemistry of Materials. American Chemical Society Jan. 10, 2017, pp 213-242. doi:10.1021/acs.chemmater.6b03183.

(17) Bloembergen, N.; Purcell, E. M.; Pound, R. V. Relaxation Effects in Nuclear Magnetic Resonance Absorption. 1948, 73 (7), 679-712. doi:10.1103/physrev.73.679.

(18) Chen, H.; Adams, S. Bond Softness Sensitive Bond-Valence Parameters for Crystal Structure Plausibility Tests. IUCrJ 2017, 4, 614-625. doi:10.1107/S2052252517010211.

(19) Helm, B.; Minafra, N.; Wankmiller, B.; Agne, M. T.; Li, C.; Senyshyn, A.; Hansen, M. R.; Zeier, W. G. Correlating Structural Disorder to Li+Ion Transport in Li4−XGe1−XSbxS4(0≤x≤0.2). Chemistry of Materials 2022, 34 (12), 5558-5570. doi:10.1021/acs.chemmater.2c00608.

(20) Gao, Y.; Nolan, A. M.; Du, P.; Wu, Y.; Yang, C.; Chen, Q.; Mo, Y.; Bo, S. H. Classical and Emerging Characterization Techniques for Investigation of Ion Transport Mechanisms in Crystalline Fast Ionic Conductors. Chemical Reviews. American Chemical Society Jul. 8, 2020, pp 5954-6008. doi:10.1021/acs.chemrev.9b00747.

The invention claimed is:

1. A method for making a compound having the formula $Na_{u+y}N_{w-y}M_yLa_zCl_{3-v}X_v$, wherein N is Ta, Nb, or a combination thereof;
M is Zr, Hf, or a combination thereof;
u is from 0.1 to 0.7;
when v is not zero, X is Br or I;
the sum (u+y)+5(w−y)+4y+3z is equal to 3;
w is from 0.04 to 0.40;
v is less than or equal to 3;
y is from zero to less than 0.4;
z is not zero; and
the sum of u+y is from 0.10 to 0.75, the method comprising mixing in the solid state NaCl, NCl$_5$, MCl$_4$, LaCl$_3$, and optionally NaBr or NaI.

2. The method of claim 1, wherein NaCl, NCl$_5$, MCl$_4$, LaCl$_3$, and optionally NaBr or NaI are substantially anhydrous.

3. The method of claim 1, wherein NaCl, NCl$_5$, MCl$_4$, LaCl$_3$, and optionally NaBr or NaI are mixed for less than two hours.

4. The method of claim 1, wherein NaCl, NCl$_5$, MCl$_4$, LaCl$_3$, and optionally NaBr or NaI are mixed by mechanochemical milling.

5. The method of claim 1, wherein NaCl, NCl$_5$, MCl$_4$, LaCl$_3$, and optionally NaBr or NaI are mixed in an inert atmosphere.

6. The method of claim 1, wherein M is Zr and N is Ta.

7. The method of claim 1, wherein M is Zr and N is Nb.

8. The method of claim 1, wherein M is Hf and N is Ta.

9. The method of claim 1, wherein M is Hf and N is Nb.

10. The method of claim 1, wherein the difference of w−y is from 0.04 to 0.40.

11. The method of claim 1, wherein z is greater than zero and less than 0.75.

12. The method of claim 1, wherein v is from zero to 3.00.

13. The method of claim 1, wherein when v is greater than zero, X is Br.

14. The method of claim 1, where the compound has the formula $Na_{u+y}N_{w-y}M_yLa_zCl_3$, wherein N is Ta and M is Zr.

15. The method of claim 14, wherein
u+y is from 0.10 to 0.75;
w−y is from 0.04 to 0.40;
y is from 0.00 to less than 0.40; and
z is from 0.10 to 0.75.

16. The method of claim 1, where the compound has the formula $Na_{u+y}N_{w-y}M_yLa_zCl_{3-v}X_v$, wherein N is Ta, M is Zr, and X is Br or I.

17. The method of claim 16, wherein
u+y is from 0.10 to 0.75;
w−y is from 0.04 to 0.40;
y is from 0.00 to less than 0.40;
z is from 0.10 to 0.75; and
v is from 0.001 to 3.00.

18. The method of claim 1, wherein v is greater than zero to 3.00.

19. The method of claim 1, wherein z is from 0.10 to 0.75.

20. A compound produced by the method of claim 1.

\* \* \* \* \*